Patented June 6, 1950

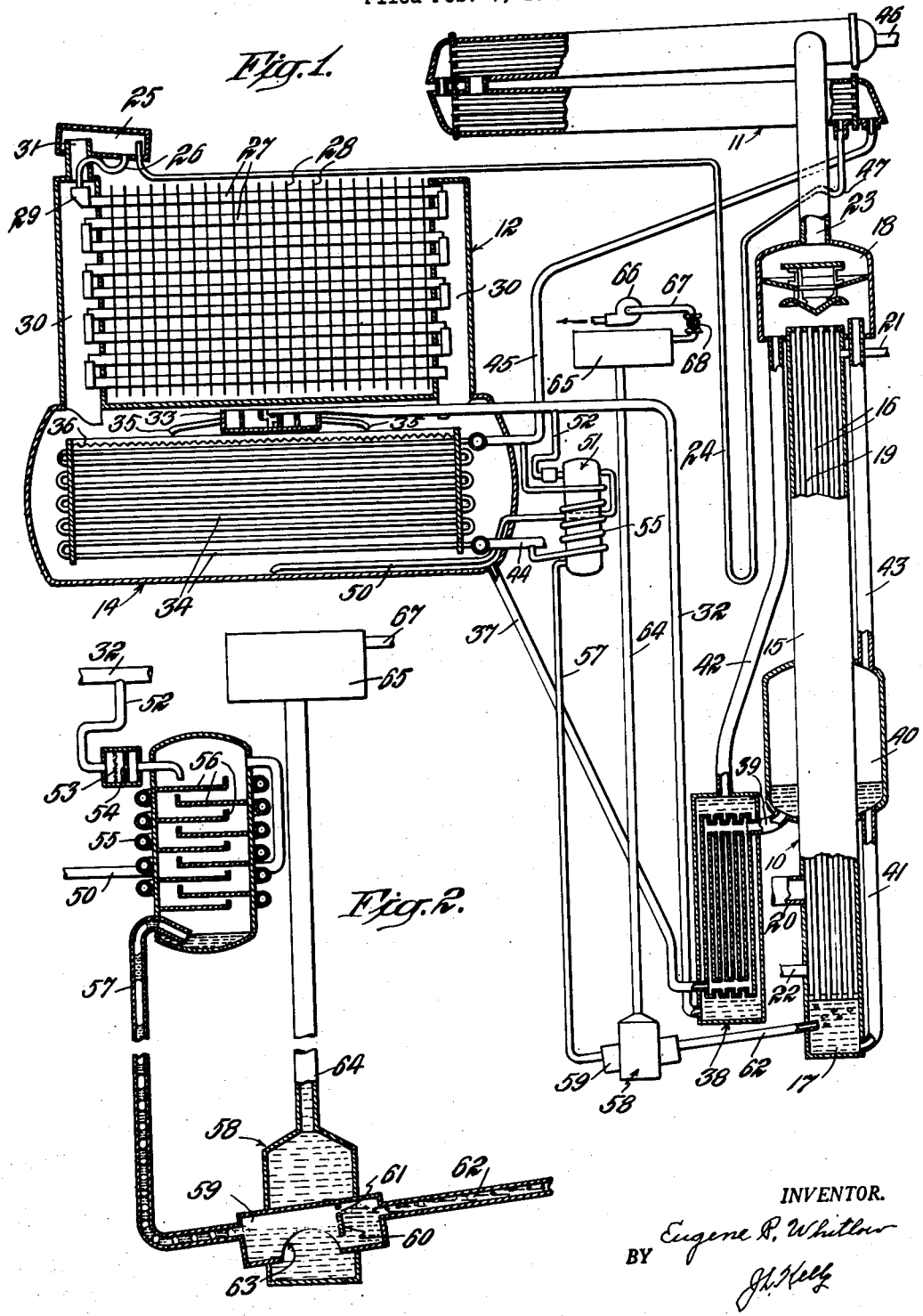

2,510,730

UNITED STATES PATENT OFFICE 2,510,730

LOW-PRESSURE ABSORPTION REFRIGERATING SYSTEM

Eugene P. Whitlow, Evansville, Ind., assignor to Servel, Inc., New York, N. Y., a corporation of Delaware Application February 7, 1947, Serial No. 727,101

7 Claims. (Cl. 62—119)

This invention relates to absorption refrigeration and particularly to means for reducing superheat and its ensuing noise in the generator of an absorption refrigerating apparatus.

In absorption refrigerating apparatus, particularly the vacuum or low pressure type, it is found that non-condensable gases collect in certain parts of such apparatus with detriment to the efficiency thereof. Should non-condensable gases collect, for instance, in the condenser, evaporator and/or absorber of an absorption refrigerating apparatus in excessive quantities, such gases blank off the portion or portions of these elements in which the gases collect, thereby reducing the capacity of the elements, which in turn reduces the efficiency of the apparatus. It has also been found in practice that the presence of a limited quantity of non-condensable gases is desirable in an absorption refrigerating apparatus, in that such gases form vapor nuclei which promote quiet boiling of solution in the generator, whereby superheat and its accompanying noise is reduced.

Various means have been used for withdrawing non-condensable gases from absorption refrigerating apparatus. In the U. S. patent to A. R. Thomas No. 2,384,860, granted September 18, 1945, for instance, a very effective means is disclosed for withdrawing non-condensable gases from a low-pressure absorption refrigerating apparatus. In fact, it has been found in practice that gas-withdrawing devices built in accordance with this Thomas patent are too effective, in that after refrigerating apparatus incorporating such devices have been in operation for a period of time the apparatus are substantially stripped of non-condensable gases.

It is therefore an object of this invention to provide means for withdrawing non-condensable gases from certain parts of an absorption refrigerating system in which parts the presence of such gases is detrimental to the operation of the system, and for returning the withdrawn gases, or at least a portion thereof, in gas phase to other parts of the system wherein the presence of these gases aids in the operation of the system.

It is a further object of this invention to provide in an absorption refrigerating system means for retaining a measured quantity of non-condensable gases in gas phase in the system.

The invention together with its objects and advantages will be more clearly understood from the following detailed description taken in connection with the accompanying drawing, in which:

Fig. 1 is a view diagrammatically illustrating a refrigerating system embodying the invention; and Fig. 2 is an enlarged fragmentary view of certain parts shown in Fig. 1.

For purposes of illustration, I have incorporated my invention in a two-pressure absorption refrigerating system like that disclosed in the above Thomas patent. A system of this type operates at low pressures and includes a generator or vapor expeller 10, a condenser 11, an evaporator 12 and an absorber 14 which are interconnected in such a manner that flow of fluid between the high and low pressure sides of the system is regulated by liquid columns. The disclosure in the aforementioned Thomas patent may be considered as being incorporated in this application, and, if desired, reference may be made thereto for a detailed description of the refrigerating system.

As shown in Fig. 1, the generator includes an outer shell 15 within which are disposed a plurality of vertical riser tubes 16 having the lower ends thereof connected to receive liquid from an inlet chamber 17 and the upper ends extending into and above the bottom of a separating vessel 18. A space 19 within shell 15 forms a chamber to which steam is supplied through a conduit 20 from a suitable source of supply, so that full length heating of the tubes 16 is effected. A vent 21 is provided at the upper end of shell 15, and a conduit 22 is connected to the bottom part of the shell for draining condensate from the space 19.

The system operates at a partial vacuum and contains, for example, a saline refrigerant-absorbent solution, in which water is the refrigerant and lithium chloride, lithium bromide or a mixture of the two is the absorbent. When steam is supplied through conduit 20 to space 19 at atmospheric pressure, heat is supplied to tubes 16 for expelling water vapor from solution. The residue absorption liquid is raised through tubes 16 by gas or vapor-lift action. The water vapor discharged from the upper ends of the tubes or risers 16 separates from the raised absorption liquid in the vessel 18 and flows through a conduit 23 into condenser 11 wherein the vapor is condensed. The condensate formed in the condenser flows through a U-tube 24 into a flash chamber 25 and from the latter through a tube 26 into evaporator 12.

The evaporator includes a plurality of horizontal banks of tubes 27 disposed one above the other and having heat transfer fins 28 secured thereto to provide a relatively large heat transfer surface. The liquid refrigerant flowing to the evaporator is divided in any suitable manner for flow through the uppermost bank of tubes 27. For example, the dividing of liquid may be effected by a liquid distributing trough 29 into which the liquid flows from the tube 26. The liquid refrigerant flows in successively lower tubes through suitable end connections which are open to permit escape of vapor from the tubes.

The liquid refrigerant supplied to tubes 27 evaporates therein to produce a refrigerating or cooling effect with consequent absorption of heat from the surroundings, as from a stream of air flowing over the exterior surfaces of the tubes 27 and fins 28. The vapor formed in tubes 27 passes out into end headers 30 which are connected at their lower ends to absorber 14. Any vapor formed in flash chamber 25 passes through a conduit 31 into one of the headers 30 and mixes with vapor formed in the evaporator 12, so that disturbances in the evaporator due to vapor flashing of incoming liquid are avoided.

In absorber 14 refrigerant vapor is absorbed into absorption liquid entering through a conduit 32. The entering absorption liquid flows into a vessel 33 in which liquid is distributed laterally with respect to a plurality of vertically disposed pipe banks 34 arranged alongside of each other. The liquid flows from vessel 33 through conduits 35 into a plurality of liquid holders and distributors 36 which extend lengthwise of and above the uppermost branches of the pipe banks 34. Absorption liquid is siphoned over the walls of the liquid holders 36 onto the upper most pipe sections. Liquid drips from each horizontal pipe section onto the next lower pipe section, so that all of the pipe sections are wetted with a film of liquid. Absorption liquid enriched in refrigerant flows from absorber 14 through a conduit 37, an inner group of passages in a liquid heat exchanger 38, a conduit 39, a stabilizing vessel 40, and a conduit 41 into the inlet chamber 17 of the generator. Water vapor is expelled out of solution in the generator by heating, and liquid is raised by gas or vapor-lift action in riser tubes 16, as explained above.

The absorption liquid in vessel 18, from which refrigerant has been expelled from solution, flows through a conduit 42, and outer group of passages in liquid heat exchanger 38 and conduit 32 into the upper part of absorber 14. This circulation of absorption liquid is effected by raising liquid in the vertical riser tubes 16 by vapor lift action, so that liquid can flow from generator 10 to absorber 14 and return from the latter to the generator by force of gravity.

The upper part of vessel 40 is connected by a conduit 43 to vessel 18, so that the pressure in vessel 40 is equalized with the pressure in the upper part of the generator and in the condenser. Vessel 40 is of sufficient volume to hold the liquid differential in the system and is of sufficient cross-sectional area that the liquid level therein does not vary appreciably, so that a substantially constant reaction head is provided for lifting liquid in the generator.

The heat liberated with absorption of water vapor in absorber 14 is transferred to a cooling medium, such as water, which flows upward through the vertically disposed pipe banks 34. The cooling water enters the lower end of the pipe banks through a conduit 44 and leaves the upper end of the pipe banks through a conduit 45. Conduit 45 is connected to condenser 11 so that the same cooling water is utilized to effect cooling of both condenser 11 and absorber 14. From the condenser the cooling water flows through a conduit 46 to waste.

During operation of the refrigeration system, non-condensable gases may collect in both the high and low pressure sides of the system. The non-condensable gases collecting in the high pressure side of the system, that is, the generator 10 and condenser 11, are carried to the dead or far end of the condenser in the bottom part thereof by the sweeping effect of the refrigerant vapor flowing into the condenser. Since the non-condensable gases are swept to the bottom part of the condenser, the U-tube 24 is effectively utilized to transfer such gases from the condenser to the evaporator by providing a trap 47 therein. Trap 47 traps gas in the down leg of tube 24 between slugs of liquid intermittently siphoned from the trap. Hence, the liquid refrigerant flowing through tube 24 to the evaporator carries with it the non-condensable gases collecting in the condenser and generator.

The non-condensable gases in the low pressure side of the system, that is, in the evaporator 12 and absorber 14, are carried to the bottom center part of the absorber by the sweeping action of the refrigerant vapor entering the top of the absorber through headers 30. In order to localize the non-condensable gases in a relatively small space, such gases are withdrawn from the bottom part of absorber 14 through a conduit 50 to the top of an auxiliary absorber 51. A small portion of the absorption liquid flowing toward the upper part of absorber 14 in conduit 32 is diverted into a conduit 52. A screen 53 removes any foreign matter in the diverted liquid tending to clog a flow-restricting device 54, and the restricting device in turn limits the rate at which liquid is diverted into conduit 52 from the main stream of absorption liquid flowing in conduit 32. The auxiliary absorber is provided with plates 56 over which the diverted absorption liquid flows.

While the gases withdrawn from absorber 14 through conduit 50 into auxiliary absorber 51 are for the most part non-condensable, these gases are not sufficiently localized in the bottom of the main absorber 14 and tests have shown that refrigerant vapor accompanies the non-condensable gases withdrawn from the main absorber. For this reason the gases withdrawn from absorber 14 are brought into intimate contact with the diverted absorption liquid in the auxiliary absorber, whereby the refrigerant vapor accompanying the non-condensable gases is absorbed into the absorption liquid. The heat liberated with absorption of refrigerant vapor in the auxiliary absorber is transferred to the cooling medium flowing through a coil 55 connected between the inlet 44 and outlet 45 of the cooling system of the main absorber. The absorption liquid and gases both flow downwardly in intimate contact with each other in the auxiliary absorber and the gases arrive at the bottom part of the auxiliary absorber substantially stripped of refrigerant vapor.

The liquid flowing by gravity to the bottom part of the auxiliary absorber enters the upper end of a conduit 57 until the conduit is closed with liquid and sealed from the gases in the bottom part of the auxiliary absorber. When the liquid level rises sufficiently in the upper curved or bent portion of conduit 57, the small quantity of liquid within the open end is siphoned past the bend into the downwardly depending straight portion thereof. When liquid is siphoned from the upper curved end of conduit 57, the liquid level falls in the bottom part of the auxiliary absorber below the upper open end of conduit 57, so that non-condensable gases pass into the upper bend or curved part of this conduit. The liquid level in the bottom part of the absorber 51 again rises to close and seal the upper end of conduit 57, and, when the liquid level again rises sufficiently, a small quantity of liquid is once more siphoned into the downwardly depending straight portion of conduit 57. In this way small quantities of non-condensable gases are withdrawn from the bottom part of auxiliary absorber 51 and trapped between successive plugs of liquid formed at the upper curved or bent portion of the conduit 57. Conduit 57, which may be referred to as a fall tube pump, is of such size that flow of liquid is not appreciably restricted, however, the internal diameter is such that gas and liquid cannot pass each other while flowing downwardly through the conduit.

In accordance with my invention, a contacting or entraining vessel, designated generally by reference character 58, is connected to the lower end of fall tube 57 to receive non-condensable gases and absorption liquid discharged from the fall tube. Vessel 58 is provided with a gas trap 59 in which is located a baffle 60 provided with a metering orifice 61. Metering orifice 61 serves to limit or control the amount of non-condensable gases retained and circulated in the system, trap 59 being provided with a notch or opening 63 through which excess non-condensable gases pass from the trap to vessel 58. A conduit 62 leads from the gas trap to inlet chamber 17 of the generator. A conduit 64 leads from the top of vessel 58 to a storage vessel or purge receiver 65. As shown in Fig. 1, a vacuum pump 66 is connected to the storage vessel by a conduit 67, which conduit is provided with a valve 68 for maintaining the system at the low pressure.

In operation, the purge pump 57 delivers alternate slugs of absorption liquid and bubbles of non-condensable gases to the gas trap 59. The absorption liquid passes under baffle 60 into conduit 62 and through this conduit into inlet chamber 17 of the generator. The non-condensable gases collect in the upper part of trap 59 as one large bubble, and pass therefrom through metering orifice 61 as minute bubbles, which minute bubbles are entrained in the absorption liquid and carried therewith through conduit 62 into the inlet chamber 17 of the generator. In the generator the non-condensable gases form nuclei which start the formation of vapor bubbles in the refrigerant-absorbent solution thereby lowering the equilibrium boiling point of the solution in the riser tubes. In this manner quiet boiling of the refrigerant-absorbent solution is promoted, and superheating of the solution and its ensuing noise is reduced.

Gas trap 59 and metering orifice 61 are so constructed and arranged that if the purge pump is pumping more non-condensable gases than it is desired to retain in the refrigerating system in gas phase, the excess of such gases will bubble out of the trap through notch 63 and into vessel 58, from whence the excess gases pass through conduit 64 into purge receiver 65. The excess gases are exhausted from the purge receiver to the atmosphere at suitable intervals by vacuum pump 66. When the non-condensable gases in a system have been reduced to an amount that will pass through orifice 61 as fast as they are collected in the trap, no more non-condensable gases will pass from the trap to the purge receiver, and just a sufficient amount of such gases in gas phase, as are necessary to promote quiet boiling and reduce superheating of the solution in the generator, will be retained and circulated in the system. In other words, means are provided for withdrawing non-condensable gases from the refrigerating system, returning to the system a measured amount of the withdrawn non-condensable gases in gas phase, and exhausting to the atmosphere any withdrawn non-condensable gases in excess of the measured amount.

It is to be noted that in phrases such as, means for withdrawing non-condensable gases from the refrigerating system, the term system, or like terms, as used herein and in the claims, defines those parts of the apparatus which are active in the production of refrigeration, as contrasted with those parts which are active in controlling the quantity of non-condensable gases that are retained and circulated in the system. In the particular disclosure the refrigerating system, apparatus or unit, comprises the generator, condenser, evaporator, absorber and the conduits which interconnect these elements for flow of refrigerant medium and absorption solution.

Having thus described my invention, I wish it to be understood that I do not desire to be limited to the exact details of construction shown and described, for obvious modifications will occur to a person skilled in the art.

What is claimed is:

1. A refrigeration system of a low pressure absorption type having a device for withdrawing non-condensable gas from the system, means to measure the withdrawn gas, a device for propelling back into the system all gas withdrawn up to a predetermined quantity, and means for exhausting to the atmosphere any excess of withdrawn gas beyond said predetermined quantity.

2. A refrigerating apparatus comprising a plurality of parts including an absorber and a generator connected for circulation of an absorption solution, means for exhausting non-condensable gases from the absorber, means for accumulating the exhausted non-condensable gases, means for reducing the accumulated non-condensable gases to minute bubbles, and means for delivering the minute bubbles of non-condensable gases below a surface level of solution in the generator.

3. A refrigerating apparatus comprising a plurality of parts including an absorber and a generator interconnected for circulation of absorption solution, means utilizing the circulation of the absorption solution for withdrawing non-condensable gases from the absorber, means for storing at least a portion of the withdrawn non-condensable gases, means for delivering the stored non-condensable gases as minute bubbles to the generator, and means for exhausting to the atmosphere any excess of withdrawn non-condensable gases beyond that required to fill the storing means.

4. An absorption refrigerating apparatus including a generator, a condenser, an evaporator, an absorber and conduits interconnecting said elements for flow of a refrigerating medium and an absorption solution, and a by-pass for flow of absorption solution from and to the generator, said by-pass including means for withdrawing non-condensable gases from the absorber, means for storing at least a portion of the withdrawn non-condensable gases, and means for delivering the stored portion of non-condensable gases in the form of minute bubbles to absorption solution en route to the generator.

5. In the art of refrigeration through the agency of a heat-operated refrigerating system, that improvement which comprises withdrawing non-condensable gases from certain parts of said system, reducing the withdrawn non-condensable gases to minute bubbles, entraining the bubbles of non-condensable gases in a working medium en route to another part of the system, applying heat to the working medium and minute bubbles of gas in said other part of the system, whereby the minute bubbles of non-condensable gases form nuclei which promote quiet boiling and reduce superheating of the working medium in the other part of the system.

6. A method of promoting quiet boiling of working medium in the vapor expeller of a heat-operated refrigerating system which comprises withdrawing non-condensable gases from said refrigerating system, and returning to the system below a surface level of liquid in the vapor expeller the withdrawn non-condensable gases in limited quantity of which at least a portion is in gas phase.

7. A method of promoting quiet boiling of refrigerant-absorbent solution in an absorption refrigerating system of the two-pressure type which comprises withdrawing non-condensable gases from said system, returning to the system a measured amount of the withdrawn non-condensable gases in gas phase, and exhausting to the atmosphere any withdrawn non-condensable gases in excess of the measured amount.

EUGENE P. WHITLOW.

REFERENCES CITED

The following references are of record in the file of this patent:

UNITED STATES PATENTS

| Number | Name | Date |
| --- | --- | --- |
| 942,367 | Dyer | Dec. 7, 1909 |
| 1,679,439 | Munters | Aug. 7, 1928 |
| 1,710,438 | Sweeney | Apr. 23, 1929 |
| 2,320,349 | Cropper | June 1, 1943 |